United States Patent [19]

Mooney et al.

[11] Patent Number: 5,119,028
[45] Date of Patent: Jun. 2, 1992

[54] METHOD AND SYSTEM FOR DETERMINING THE DEPTH OF AN ELECTRICALLY CONDUCTIVE BODY IN A MEDIUM HAVING A KNOWN CONDUCTIVITY AND A KNOWN PERMEABILITY BY MEASURING PHASE DIFFERENCE BETWEEN A PRIMARY AND SECONDARY MAGNETIC FIELD

[75] Inventors: John J. Mooney, Bethpage; Christopher J. Witt, Laurel Hollow, both of N.Y.; Michael T. Mohr, New Port Richey, Fla.

[73] Assignee: Grumman Aerospace Corporation, Bethpage, N.Y.

[21] Appl. No.: 514,618

[22] Filed: Apr. 26, 1990

[51] Int. Cl.⁵ .................. G01V 3/08; G01V 3/165; G01V 3/38
[52] U.S. Cl. .................... 324/326; 324/233; 324/329; 324/330; 324/334
[58] Field of Search ............. 324/326, 329, 330, 334, 324/335, 233, 207.17, 207.26; 342/459

[56] References Cited

U.S. PATENT DOCUMENTS

| | | | |
|---|---|---|---|
| 2,652,530 | 9/1953 | Davidson | 324/334 |
| 2,929,984 | 3/1960 | Puranen et al. | 324/335 |
| 3,521,153 | 7/1970 | Moss | 324/334 |
| 3,538,431 | 11/1970 | Moss | 324/334 |
| 3,631,351 | 12/1971 | Paine et al. | |
| 3,657,659 | 4/1972 | Johnson | |
| 3,680,092 | 7/1972 | Scott | |
| 3,984,758 | 10/1976 | Millon | 324/335 X |
| 4,024,540 | 5/1977 | Ofverberg | |
| 4,047,098 | 9/1977 | Duroux | 324/335 |
| 4,070,612 | 1/1978 | McNeill et al. | 324/334 |
| 4,165,480 | 8/1979 | Morrison | 324/334 |
| 4,238,795 | 12/1980 | Schiek et al. | |
| 4,403,857 | 9/1983 | Hölscher | |
| 4,481,517 | 11/1984 | Brown | |

Primary Examiner—Gerard R. Strecker
Attorney, Agent, or Firm—Scully, Scott, Murphy & Presser

[57] ABSTRACT

A method and system for determining the depth of an electrically conductive body in a medium having a known conductivity and a known permeability. The method comprises the steps of generating a primary magnetic field having a time-varying field strength, and transmitting that primary magnetic field into the medium. The primary magnetic field induces an electric current in the conductive body, and this electric current generates a secondary magnetic field that also has a time-varying field strength and that propagates outward from the conductive body and through the medium. The method of this invention further includes the steps of sensing the strength of that secondary magnetic field, comparing the primary and secondary magnetic fields to measure the phase difference therebetween, and then calculating the depth of the conductive body in the medium from the detected phase difference.

29 Claims, 6 Drawing Sheets

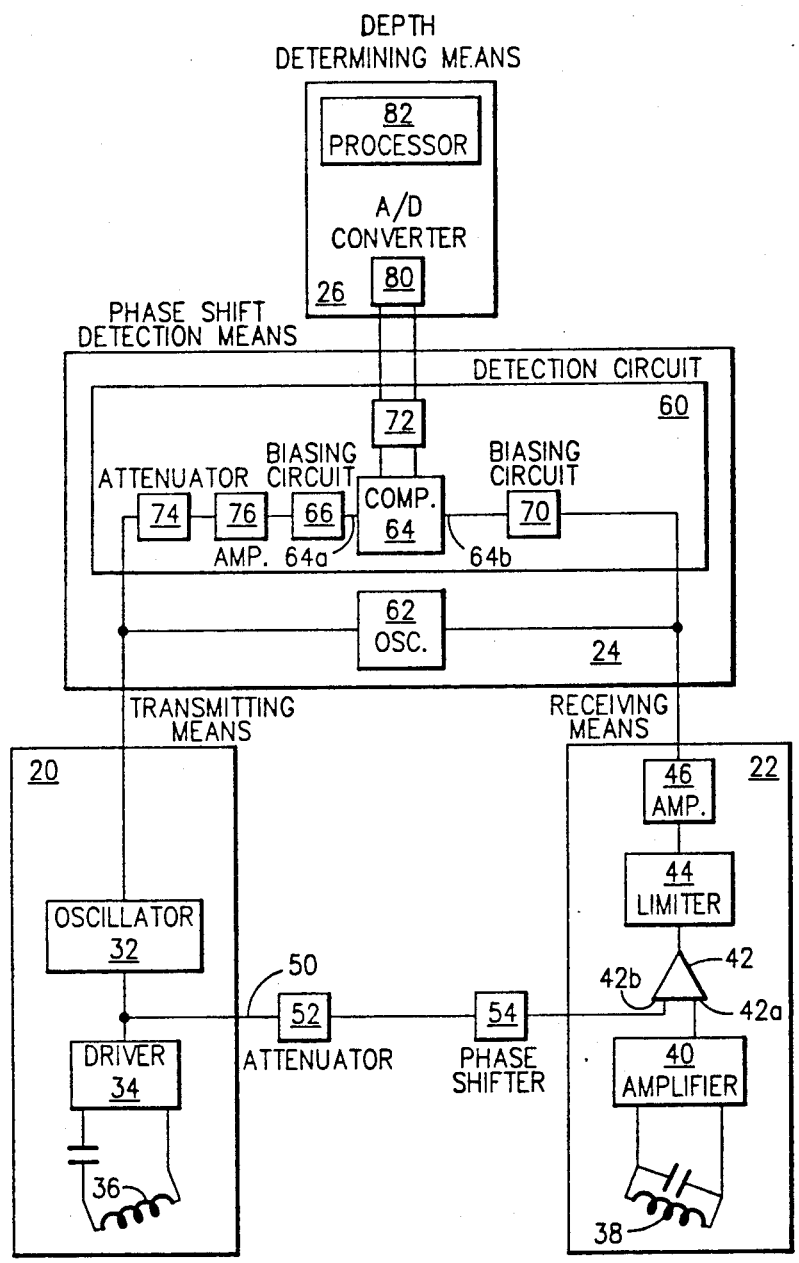
FIG.8
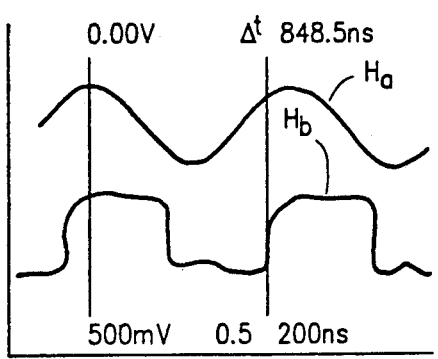
TARGET AT
4.5 IN. DEPTH FIG.11a
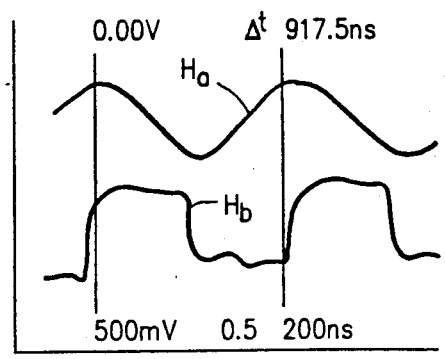
TARGET AT
6 IN. DEPTH FIG.11b

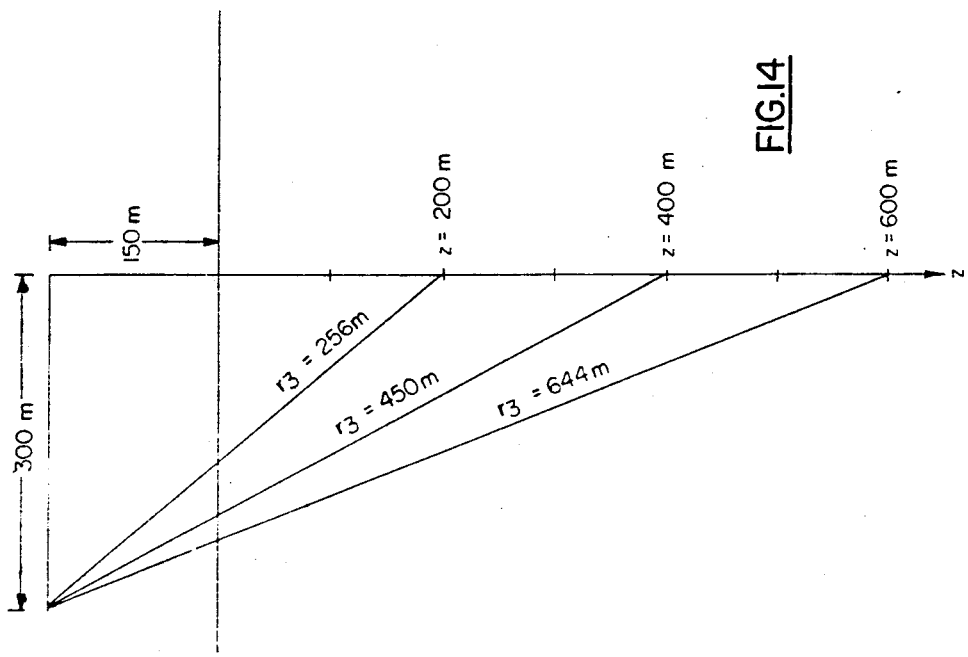
FIG.14
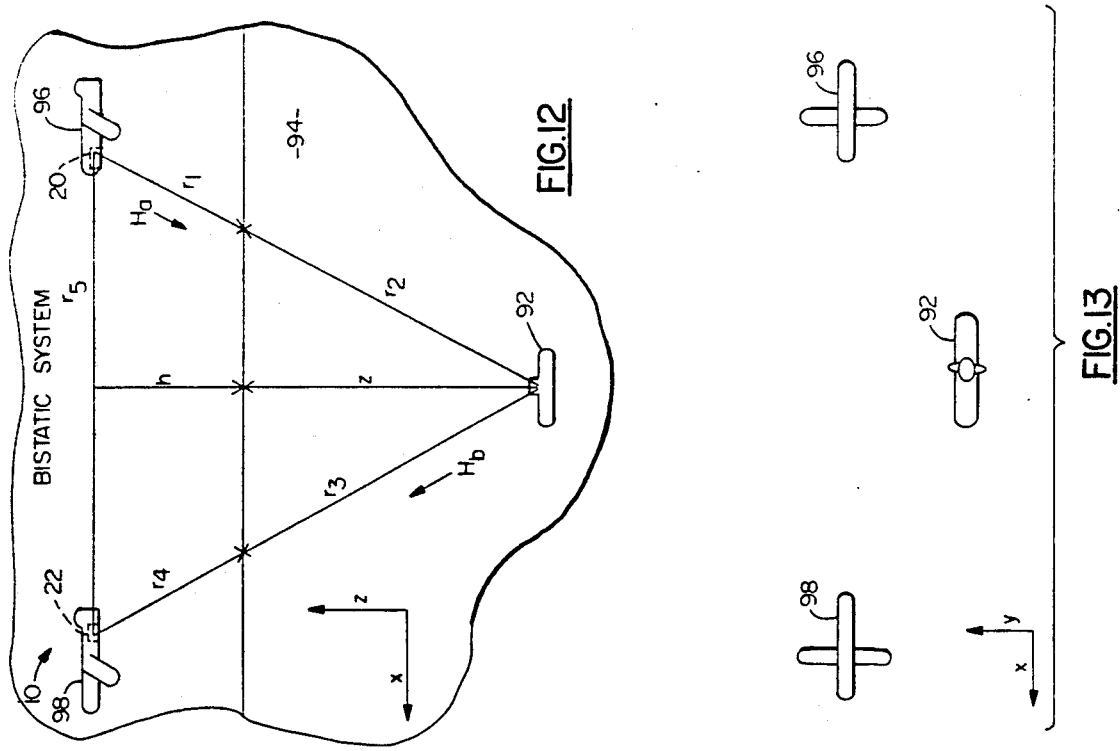
FIG.12
FIG.13

METHOD AND SYSTEM FOR DETERMINING THE DEPTH OF AN ELECTRICALLY CONDUCTIVE BODY IN A MEDIUM HAVING A KNOWN CONDUCTIVITY AND A KNOWN PERMEABILITY BY MEASURING PHASE DIFFERENCE BETWEEN A PRIMARY AND SECONDARY MAGNETIC FIELD

BACKGROUND OF THE INVENTION

This invention generally relates to methods and apparatus for detecting highly electrically conductive bodies; and more specifically, to methods and apparatus that may be effectively employed to detect such bodies immersed or embedded in a medium having a relatively, or very, low electrical conductivity such as sea water, fresh water, sand, glass and rubber.

Media such as sea water, fresh water, sand, glass and rubber, which have an electrical conductivity between about $10^4$ and $10^{-8}$ siemens/meter, are commonly referred to as lesser conducting media. Various prior art methods and apparatus are known for detecting bodies in such media; and typically these methods and apparatus are used to detect submarines in sea water, although the methods and apparatus may be used for other purposes, such as to detect weapons or mines buried in sand or earth, or to detect underground cables or wires.

These prior art systems may be broadly divided into two classes. The first class, referred to as passive magnetic anomaly detection (MAD) systems, generally rely on a passive detection of anomalous magnetic fields created by inherent ferromagnetic properties of the target. Detection is typically by means of a magnetic field receiving means, or magnetometer, which is towed from a ship or mounted on an airborne platform.

One major disadvantage of this type of passive detection system is a potentially high false alarm rate, which may be caused by background magnetic signals from sources other than the body of interest, such as normal variations in the earth's own magnetic field. Because of this, the receiving means of the detection system must be relatively close to the ferromagnetic body in order to discriminate accurately between the weak inherent magnetic signal from the body and background magnetic signals, and passive MAD systems do not work well in coastal or shallow areas where magnetic signals caused by geological gradients compete with target signals. Furthermore, aircraft maneuvers and certain geomagnetic pulsations also may interfere with the operation of a passive MAD system, especially at high latitudes, Another important disadvantage of the passive MAD system is that the target must be ferromagnetic. Because of this, the passive MAD system is not able to easily detect submarines with titanium hulls.

A second class of detection systems generally rely on passively monitoring for acoustic emissions from a target body, or on detecting active acoustic signals that are generated by the detection system and reflected by the target body back into a receiver of the detection system. These systems are known generally as passive and active sonar systems, respectively.

A characteristic of active sonar systems is that they usually rely on sound waves transmitted at frequencies above 1 kilohertz. However, acoustic signals at these frequencies attenuate rapidly in a medium such as sea water, and thus the range at which active sonar systems can detect a target is quite limited. Furthermore, while the receiver of an active sonar system monitors for a reflected acoustic signal, a receiver located on the target body itself may detect and counter the acoustic signal generated by the active sonar system at a much greater range. Therefore, for equally sensitive receivers, the target body, typically a submarine, may detect the acoustic signal generated by the sonar system at a distance approximately twice the distance at which the sonar system can detect the submarine echo. Thus, the submarine may be able to detect the presence of the sonar system and take evasive action or other counter measures before being detected by the active sonar system.

In addition, sound waves can bend upwards and downwards in water as the result of temperature and pressure gradients in the water. As a result of this bending, there may be zones or regions, referred to as sound shadow zones, in the water in which a target cannot easily be detected by an active sonar system.

Passive sonar systems, by contrast, generally rely on receiving sound waves having frequencies less than 200 hertz, that are emitted by submarine propellers, machinery, and auxiliary systems. However, submarine sound reduction programs have resulted in a very significant reduction in the amount of sound produced by certain submarines, and long range surveillance of such quiet targets cannot easily be achieved by passive sonar systems.

Other systems are known in which the phase change of a transmitted electromagnetic signal that is reflected by a body and detected by a receiver, is used to determine or measure distances; and, for example, U.S. Pat. No. 4,403,857 discloses such a system. It is also well known in radar technology to use the frequency shift imparted to an electromagnetic signal by a moving body to determine the velocity of that body.

The systems that measure distance based on the phase shift of a reflected electromagnetic wave have heretofore been limited to measuring distances through relatively non-conducting mediums, such as the distance between the detection system and an object located on the surface of an ocean, on land or in the air. A number of obstacles have prevented the adaption of such systems to detecting conducting bodies immersed in a lesser conducting medium.

A primary obstacle to using electromagnetic waves for this purpose is the rapid attenuation of electromagnetic fields and waves in lesser conducting media. For instance, the amplitude or strength of a 1 megahertz electromagnetic wave traveling through sea water attenuates by a factor of 1/e, referred to as 1 neper of attenuation, every 0.25 meter. Similarly, a magnetic field passing through sea water and having a magnetic flux density or strength at its source of $6 \times 10^5$ Tesla, is attenuated by the sea water to a flux density of less than $10^{-6}$ nanotesla in less than 12 meters of the sea water. Since, with equipment suitable for use in a practical target detection system, $6 \times 10^5$ Tesla is about the maximum magnetic field strength that can be currently generated, and $10^{-6}$ nanotesla is about the minimum magnetic field strength that can be detected, such a system could use a magnetic field to detect a target in sea water only to a depth of about 6 meters. However, submarines typically operate in seawater at depths of as low as 450 to 500 meters, and thus submarines cannot be detected at such depths using a system as outlined above.

Another obstacle to the use of electromagnetic waves to determine distances in lesser conducting media is the rapid phase change of an electromagnetic wave traveling in such a medium. More specifically, once the phase shift of an electromagnetic wave that is transmitted to and reflected off the target body, becomes greater than $2\pi$ that phase shift is an ambiguous indicator of the position of the target body. A 1 megahertz electromagnetic wave transmitted through sea water undergoes a phase change of $2\pi$ approximately every 1.6 meters, and thus such a wave cannot be used to determine unambiguously the actual depth of a body located more than approximately 0.8 meters below the surface of a body of sea water.

SUMMARY OF THE INVENTION

An object of this invention is to use an actively transmitted magnetic field to detect the presence of an electrically conductive body in a medium.

Another object of the present invention is to detect electrically conductive bodies in a lesser conducting medium at depths at which such bodies could not heretofore be detected by conventional detection systems using plane electromagnetic waves.

A further object of this invention is to generate a primary time-varying magnetic field, to use that field to cause a conductive body immersed in a lesser conducting medium to generate a secondary time-varying magnetic field, and to use the phase shifts imparted to the primary and secondary magnetic fields by the lesser conducting medium to detect the presence and depth of the conductive body in that medium.

These and other objectives are attained with a method and apparatus for detecting an electrically conductive body in a medium. The method comprises the steps of generating a primary magnetic field having a time-varying field strength, and transmitting that field into the medium. This magnetic field induces an electric current in the conductive body; and that electric current, in turn, generates a secondary magnetic field, which also has a time-varying field strength and propagates outward from the conductive body and through the medium. The method further comprises the steps of sensing the strength of this secondary magnetic field, and detecting phase shifts in the primary and secondary magnetic fields caused by the medium as the primary field is transmitted through the medium to the conductive body, and as the secondary field propagates outward from the conductive body and through the medium. The presence of a phase shifted secondary magnetic field indicates that the conductive body is present in the medium.

The primary magnetic field is generated by producing a primary magnetic dipole having a primary magnetic moment, and varying the amplitude of that magnetic moment. The electric currents induced in the conductive body by the primary magnetic field produce a secondary magnetic dipole having a secondary magnetic moment, and this secondary magnetic dipole produces the secondary magnetic field. Because the strength of the primary magnetic field varies over time, the magnitude of the secondary magnetic moment also varies over time, and this causes the strength of the secondary magnetic field to vary over time.

Preferably, the method of this invention further comprises the steps of determining the depth of the conductive body in the medium from the detected phase shifts. For example, by generating a primary magnetic moment having a maximum strength of 31 Tesla-m$^3$, and varying the strength of that moment at a frequency of 1 Hz, the present invention may be employed to detect conductive bodies such submarines in seawater at depths of up to about 400 meters.

The present invention overcomes many of the problems of prior art methods of detecting conductive bodies immersed in lesser conducting media. For example, since the present invention actively induces a magnetic field that is used to detect the target, the method and system of this invention are much better able than are conventional passive magnetic anomaly detection systems, to detect submarines with titanium hulls, as well as other hulls, that inherently generate no, or only very small, magnetic fields of ferromagnetic origin.

In addition, by selecting the frequency at which the primary magnetic moment is varied, the present invention may be effectively employed to discriminate between relatively strong magnetic fields generated by large conductive bodies such as a submarine, and weaker fields generated by neighboring less conductive objects. The magnetic fields generated by a large conductive body are also stronger and at a different frequency than are magnetic fields due to geological gradients; and, therefore, the system of the present invention may be used to detect conductive bodies in shallow waters and coastal areas.

Furthermore, within the effective range of the primary magnetic field, that field exists substantially completely throughout the entire volume of the lesser conductive medium. Thus, in contrast to active sonar systems, there are virtually no zones or regions in that medium in which a target body cannot be detected. Also, it would be difficult for a target object such as a submarine, to detect the primary magnetic field used in the present invention because the antenna necessary to sense that field might restrict the operation of the submarine.

In addition, the present invention, as taught herein, may be utilized to determine the depth and surface coordinates of the conductive body—that is, to identify the position of the conducive body in three mutually orthogonal directions. Still further, the magnetic fields used in the present invention are much better able than acoustic waves to penetrate certain lesser conducting media such as sand and ice, and thus the present invention is much better able to detect conductive bodies immersed in such media.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 8 is a more detailed block diagram of a detection system embodying the present invention.

FIGS. 11a and 11b show phase differences between magnetic fields generated in the application of the invention illustrated in FIGS. 9 and 10.

FIG. 12 illustrates a second application of this invention, referred to as a bistatic operation.

FIG. 13 is a top view of the system shown in FIG. 12.

FIG. 14 shows the relationship between a determined distance and the depth of an object detected by the present invention.

DETAILED DESCRIPTION OF THE PREFERRED EMBODIMENTS

Figure 1:
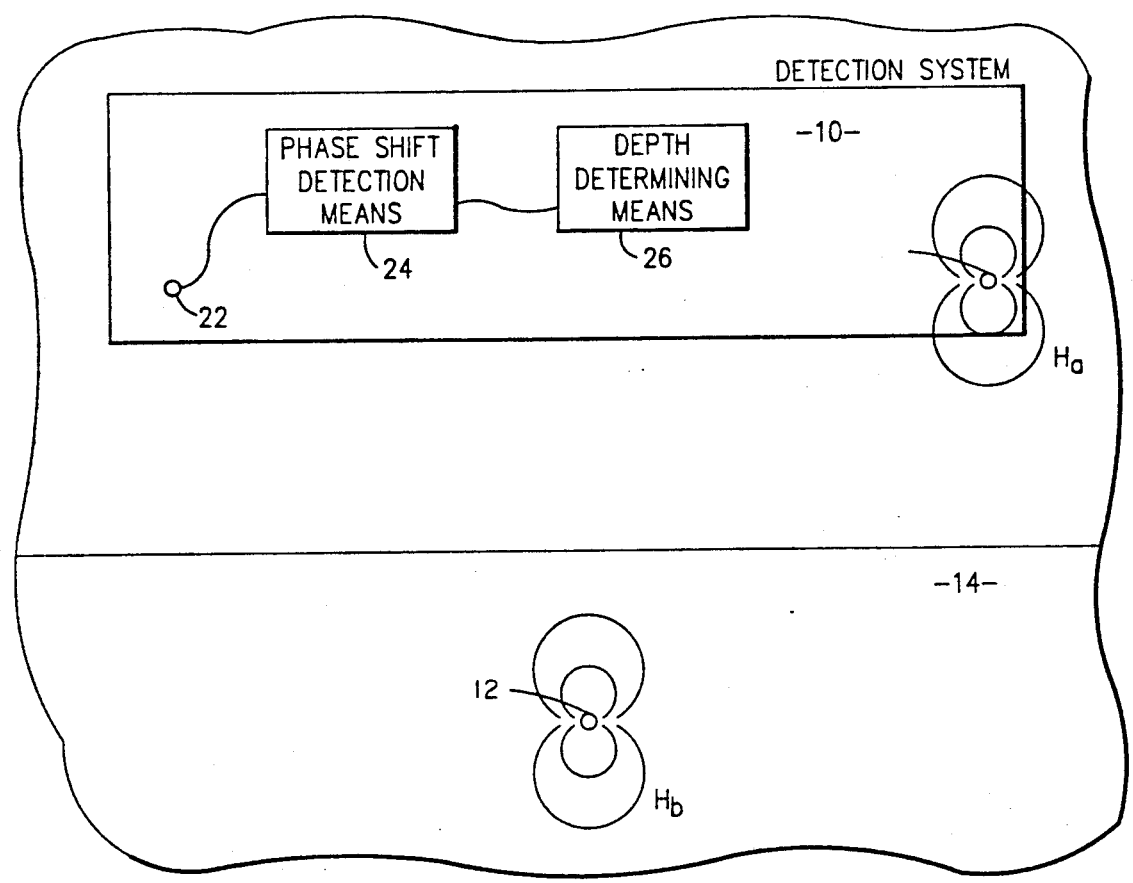
FIG. 1 generally illustrates a system according to this invention employed to detect an object immersed in a medium.

FIG. 1 generally illustrates how a detection system 10 may be operated according to the present invention to detect an electrically conductive body 12 in a medium 14 having a relatively low conductivity. Transmitting means 20 produces a primary magnetic dipole having a primary magnetic dipole moment, represented herein by the symbol $M_a$, and this magnetic dipole moment generates a primary magnetic field $H_a$. The magnitude of the primary magnetic dipole moment, and hence the magnetic flux density, or strength, of the primary magnetic field, varies over time in a sinusoidal pattern. Field $H_a$ propagates outward in all directions from transmitting means 20; and in particular, field $H_a$ is transmitted into medium 14.

If a conductive body 12 is in medium 14, the primary magnetic field $H_a$ induces surface electric currents in that body. These currents circulate in the skin of the body 12 and produce a secondary magnetic dipole having a secondary magnetic dipole moment, represented herein by the symbol $M_b$, and this magnetic dipole moment generates a secondary magnetic field $H_b$. Because the flux density of field $H_a$ varies over time, the currents induced in the conductive body 12 also vary over time; and thus, the magnitude of the secondary magnetic dipole moment and the strength of field $H_b$ vary over time. Indeed, because the strength of field $H_a$ varies over time in a sinusoidal pattern, the strength of field $H_b$ also varies over time in a sinusoidal pattern.

This second field $H_b$ propagates outward in all directions from body 12. In particular, field $H_b$ propagates from the conductive body, through medium 14, and is sensed by receiving means 22 of system 10, and the receiving means generates a signal proportional to the strength of the sensed magnetic field $H_b$ and transmits that signal to phase shift detection means 24. This detection means compares the phase of this time varying second field $H_b$ with the phase of the first magnetic field $H_a$ at the transmitting means 20, and determines if there is any difference between these two phases. The presence of such a phase-shifted, second time varying magnetic field indicates that a conductive body is present in medium 14; and, for example, detection means 24 may produce a signal or generate an alarm upon sensing such a phase-shifted, second magnetic field to alert an operator, or to record the fact, that a conductive body has been detected in the medium 14. Preferably, detection means 24 generates a signal indicating the magnitude or extent of the difference between the phases of fields $H_b$ and $H_a$ due to the passage of the fields through medium 14, and that signal is transmitted to depth determining means 26, which processes that signal to determine the depth of the conductive body 12 in medium 14.

More specifically, transmitting means 20 generates and propagates magnetic field $H_a$ by alternating an electric current through a conductive coil at the frequency at which it is desired to vary the strength of the magnetic field $H_a$, and any suitable specific means may be employed to do this. The preferred embodiment of the transmitting means may vary depending upon the specific application of system 10 and the desired strength of magnetic field $H_a$. For example, if system 10 is used to detect objects immersed a few feet in sand or water, then transmitting means 20 may comprise an alternating current source connected to a conventional coil of conductive wire. This alternating current, and thus the flux density of magnetic field $H_a$, may have a frequency of about 1 Hz to 1 MHz, and such a system may be able to generate a magnetic moment having an amplitude of about 35 Tesla-m$^3$.

Alternatively, if system 10 is used to detect objects, such as a submarine, immersed several hundred meters in water, transmitting means 20 may comprise an alternating current source connected to a coil of superconductive wire and having a diameter of several meters. Such a system may be able to generate a magnetic field having a maximum field strength of about $6 \times 10^5$ Tesla, and to vary the strength of that field at an ultra low frequency such as 1 Hz. Preferably, though, the frequency at which the strength of the magnetic field $H_a$ is varied can itself be chosen or varied by an operator; and once that frequency is chosen, system 10 is capable of maintaining that frequency at which the magnetic field strength is varied at, or within a very narrow range of, that chosen frequency.

Any suitable receiving means 22 may be utilized in the practice of the present invention, and the preferred embodiment of the receiving means may also vary depending upon the specific type of operation for which system 10 is intended. For instance, on the one hand, if system 10 is used to detect objects immersed a few feet in a lesser conductivity medium, then the induced magnetic field propagated from that object may be relatively strong, and a simple receiving coil formed from conventional electrically conductive wire and that is capable of detecting a magnetic field strength that varies at frequencies on the order of 1 MHz, may be used to detect that induced magnetic field. On the other hand, if system 10 is used to detect objects immersed hundreds of meters in a lesser conducting medium, then the secondary or induced magnetic field propagated from those objects may be quite weak, and the receiving means may employ highly sensitive superconducting quantum interference devices, known as SQUIDS, of the Josphson type, which are capable of detecting magnetic field intensities on the order of picoteslas, and variations in those field intensities occurring at a frequency of 1 Hz to 10 Hz.

Phase shift detection means 24 may operate in any suitable manner to detect the sum of the phase shifts in the time varying primary magnetic field $H_a$ and the time varying secondary magnetic field $H_b$ caused b medium 14 as field $H_a$ is transmitted to conductive body 12 from transmitting means 20, and field $H_b$ is transmitted to receiving means 22 from conductive body 12. The specific type of phase shift detecting means used in system 10 may depend on the particular application for which the system is intended. Typically, detection means 24 is provided with first and second input signals to represent, respectively, the phase of the primary field $H_a$ at transmitting means 20, and the phase of the secondary field $H_b$ at receiving means 22. This first input signal may be, for example, a signal, separate from the primary magnetic field $H_a$ itself, generated by transmitting means 20, that is in phase with the primary magnetic field and that is coupled to detection means 24. Alternatively, the phase detection means may be provided with a receiver to sense the primary magnetic field and to generate a signal proportional to the strength thereof, with this signal being used to represent the phase of the primary magnetic field at the transmitting means 20. The second input signal to the phase shift detection means may be an electrical signal from receiving means 22 that is in phase with the time variations in the strength of the secondary magnetic field $H_b$.

Depth determining means 26 operates in any suitable manner to determine the depth of a sensed target from the measured phase shift, and various specific procedures or devices may be employed to do this. For example, the depth determining means may be or include a processor programmed to calculate a depth value according to a given equation, or provided with a look-up table to determine the appropriate depth value for any given phase-shift value.

Figure 2:
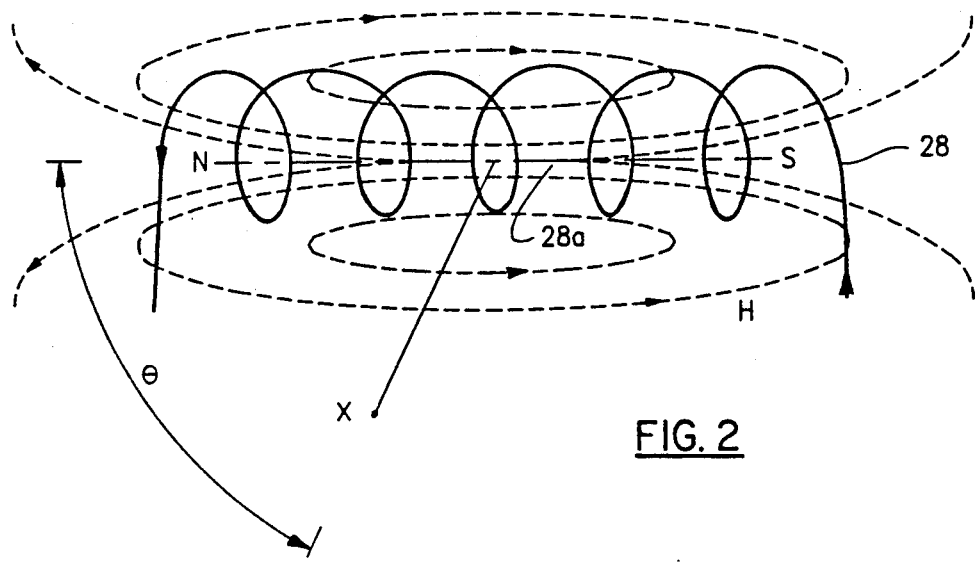
FIG. 2 shows a magnetic dipole formed by a coil of wire, and a magnetic field generated by that dipole.

FIG. 2 depicts a magnetic field H generated when a current is conducted through a coil 28. When current is conducted through the coil, that coil becomes a magnetic dipole, having a north pole N, a south pole S and a magnetic dipole moment M given by the equation:

$$M = \mu N I A \quad (1)$$

where,
$\mu$ is the magnetic permeability of the coil,
N is the number of turns of the coil,
I is the current conducted through the coil, and
A is the cross-section area of each coil turn.

This magnetic moment produces the magnetic field H. This magnetic field propagates outward from coil 28; however, at any point in space outside the coil, the direction of the force of field H is always perpendicular to the direction of propagation of the field at that point. The dashed lines shown in FIG. 2 represent lines of magnetic force; and when current is conducted through coil 28 in the direction shown by the arrows drawn on the coil, the direction of the force of field H along these lines is shown by the arrows drawn on those dashed lines.

In free space, or a vacuum, the magnitude of the magnetic field H at point X outside the coil is given by the generalized equation:

$$H = \frac{M(1 + 3\cos^2\theta)^{\frac{1}{2}}}{4\pi x^3} \quad (2)$$

where, $\theta$ is the angle between the axis 28a of the coil, and a line drawn through point X and the center of that axis, and
x is the distance between point X and the center of the coil axis.

The term $(1 + 3\cos^2\theta)^{1/2}$ varies between 1 and 2, and to simplify the equations and calculations given below, this term will be set to its minimum value, 1. Thus equation (2) becomes $$H = \frac{M}{4\pi x^3} \quad (3)$$

Figure 3:
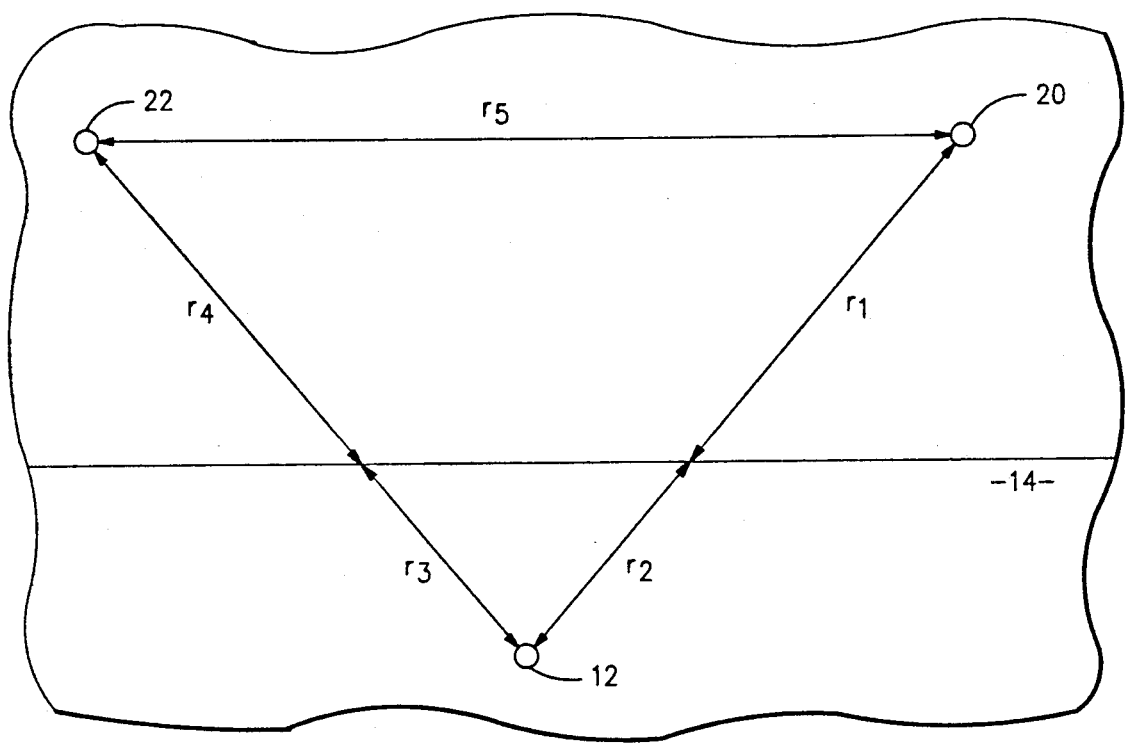
FIG. 3 is similar to FIG. 1 and with various distances specifically identified.

The operation of system 10 will be discussed in greater detail with reference to FIG. 3, which is similar to FIG. 1, and in which various distances are specifically labelled. In particular, along the line between transmitting means 20 and the conductive body 12, the distance between the transmitting means and the surface of medium 14 is $r_1$, and the distance between that surface and the conductive body 12 is $r_2$. Along the line between conductive body 12 and receiving means 22, the distance between the conductive body and the surface of medium 14 is $r_3$, and the distance between that surface and the receiving means is $r_4$. The straight line distance between transmitting means 20 and receiving means 22 is $r_5$. Also, for the sake of clarity, detection means 24 and 26 of system 10 are not shown in FIG. 3. From the general equation (3), the strength of field $H_a$ at a point in free space is given by the equation:

$$H_a = \frac{M_a}{4\pi x^3} \quad (4)$$

where x is the distance between that point and transmitting means 20. As the field $H_a$ passes through medium 14, the strength of that field continues to be attenuated by a factor of $x^{-3}$. In addition, the magnetic field is also attenuated by the medium 14 itself by a factor of $e^{-r/\delta}$, where r is the distance the magnetic field has traveled in medium 14, and $\delta$ is a constant, referred to as the skin depth of the medium, equal to the distance over which the medium attenuates a magnetic field by a factor of 1/e. While $\delta$ can be estimated for some mediums from theoretical definition and considerations, it is generally determined empirically for non-uniform media.

Hence the strength of magnetic field $H_a$ at the conductive boy 12 (represented herein by the symbol $H_{aB}$) is determined by, first, substituting $r_1 + r_2$ for x in equation (4), and second, multiplying the right hand of this equation by $e_{-r}^{2/\delta}$. That is:

$$H_{aB} = \frac{M_a}{4\pi (r_1 + r_2)^3} e^{-r_2/\delta} = \frac{M_a e^{-r_2/\delta}}{4\pi (r_1 + r_2)^3} \quad (5)$$

This magnetic field $H_a$ induces an electric current in the conductive body 12, and this current produces a magnetic dipole, having a magnetic dipole moment, in conductive body 12; and this magnetic dipole, in turn, generates a magnetic field $H_b$ that propagates outward from that conductive body. This latter magnetic field may be referred to as an induced magnetic field or a secondary magnetic field. This latter magnetic field is also occasionally referred to as a scattered field since, from the point of view of an observer who may not be concerned with the detailed mechanics of the transfer of energy from field $H_a$ to field $H_b$, the latter magnetic field can be considered as being caused, simply, by the conductive body 12 scattering the magnetic field $H_a$ incident on it. In order to use terminology consistent, the magnetic field generated by the current induced in conductive body 12 will be referred to herein as the induced field or the secondary magnetic field.

The magnitude of the magnetic dipole movement $M_b$ produced in the conductive body 12 by the primary magnetic field at the conductive body is related to $H_{aB}$ according to the following equation:

$$M_b = a_m H_{aB} \quad (6)$$

where $a_m$ is a factor referred to as the magnetic polarizability of the conductive body 12. The magnetic polarizability of an object depends on a multitude of factors, including the size and shape of the object, its orientation relative to the incident magnetic field and the material or materials from which the object is made.

The magnetic polarizability of an object is a negative number, and the negative value represents the fact that the time-varying magnetic moment $M_b$ is $\pi$ radians out of phase with the time varying magnetic field $H_a$ incident on the conductivity body. It follows that the time-varying magnetic field $H_b$ generated by the magnetic dipole produced in the conductive body 12 by magnetic field $H_a$ is also $\pi$ radians out of phase with the field $H_a$.

If conductive body 12 were in free space, from the general equation (3), the strength of field $H_b$ at a point in space would be given by the equation:

$$H_b = \frac{M_b}{4\pi x^3} \quad (7)$$

where x is the distance between that point and the conductive body. Because conductive body 12 is immersed in medium 14, the strength of field $H_b$ is further attenuated as it travels through that medium by a factor of $e^{-r/\delta}$, where r is the distance the magnetic field has travelled in medium 14, and $\delta$ is the skin depth of medium 14 for the magnetic field $H_b$.

Thus, the strength of magnetic field $H_b$ at the receiving means 22 of detection system 10 (represented herein by the symbol $H_{bR}$ is determined by, first, substituting $(r_3+r_4)$ for x in equation (7), and second, multiplying the right hand side of this equation by $e^{-r_3/\delta}$. That is:

$$H_{bR} = \frac{M_b}{4\pi (r_3 + r_4)^3} e^{-r_3/\delta} = \frac{M_b e^{-r_3/\delta}}{4\pi (r_3 + r_4)^3} \quad (8)$$

The strength of the field $H_b$ at the receiving means can be expressed in terms of the primary magnetic dipole moment, $M_a$, as follows. First, substituting the right side of equation (6) for $M_b$ in equation (8) gives:

$$H_{bR} = \frac{a_m H_{aB} e^{-r_3/\delta}}{4\pi (r_3 + r_4)^3} \quad (9)$$

Second, substituting the right side of equation (5) for $H_{aB}$ in equation (9) yields:

$$H_{bR} = \frac{a_m e^{-r_3/\delta}}{4\pi (r_3 + r_4)^3} \cdot \frac{M_a e^{-r_2/\delta}}{4\pi (r_1 + r_2)^3} \quad (10)$$

Equation (10) can be simplified as follows:

$$H_{bR} = \frac{a_m M_a e^{-(r_2+r_3)/\delta}}{16\pi^2 (r_3 + r_4)^3 (r_1 + r_2)^3} \quad (11)$$

One ratio of interest is the ratio of $H_a$ at the receiving means 22 to $H_{bR}$. The former field strength, represented by the symbol $H_{aR}$ is:

$$H_{aR} = \frac{M_a}{4\pi r_5^3} \quad (12)$$

Thus, the ratio of $H_{aR}$ to $H_{bR}$ is:

$$\frac{H_{aR}}{H_{bR}} = \frac{M_a/4\pi r_5^3}{(a_m M_a e^{-(r_2+r_3)/\delta})/16\pi^2 (r_3 + r_4)^3 (r_1 + r_2)^3} \quad (13)$$

$$\frac{H_{aR}}{H_{bR}} = \frac{M_a}{4\pi r_5^3} \cdot \frac{16\pi^2 (r_3 + r_4)^3 (r_1 + r_2)^3}{-a_m M_a e^{-(r_2+r_3)/\delta}} \quad (14)$$

$$\frac{H_{aR}}{H_{bR}} = \frac{4\pi (r_3 + r_4)^3 (r_1 + r_2)^3}{a_m r_5^3 e^{-(r_2+r_3)/\delta}} \quad (15)$$

In the case where the primary magnetic field is generated by conducting a current I through a coil having N loops, each of which covers an area A, then, from the generated equation (1), $M_a$ is:

$$M_a = \mu N I A \quad (16)$$

where $\mu$ is the magnetic permeability of the coil.

In such a case, $H_{bR}$ can be expressed in terms of the above-given parameters of the transmitting coil by substituting the right side of equation (16) for $M_a$ in equation (11), which yields:

$$H_{bR} = \frac{a_m \mu N I A e^{-(r_2+r_3)/\delta}}{16\pi^2 (r_3 + r_4)^3 (r_1 + r_2)^3} \quad (17)$$

Even more specifically, for the following values,
N = 25
I = $10^4$ amps
$\mu = 4\pi \times 10^{-7}$ Tesla-m/amp
A = $10^2 m^2$
$\delta$ = 250 m (which is the value of $\delta$ for seawater when the conductivity, $\sigma$, of the seawater is 4 siemens/m)
$r_1 = r_4 = 200$ m
$r_2 = r_3 = 400$ m
$H_{bR}$ can be calculated as follows.

$$H_{bR} = \frac{a_m \left(4\pi \times 10^7 \frac{\text{Tesla} - \text{m}}{\text{amp}}\right)(25)(10^4 \text{ amp})(10^2 \text{ m}^2) e^{-(400\,m + 400\,m)/250\,m}}{16\pi^2 (200\,m + 400\,m)^3 (200\,m + 400\,m)^3} \quad (18)$$

$$H_{bR} = \frac{a_m (100\pi \times 10^{-1})(\text{Tesla} - m^3) e^{-800\,m/250\,m}}{16\pi^2 (600\,m)^3 (600\,m)^3} \quad (19)$$

$$H_{bR} = \frac{a_m (10\pi)(\text{Tesla} - m^3) e^{-3.2}}{16\pi^2 (6 \times 10^2\,m)^3 (6 \times 10^2\,m)^3} \quad (20)$$

$$H_{bR} = \frac{a_m(10)(\text{Tesla} - m^3)(1/e^{3.2})}{16\pi(216 \times 10^6 \, m^3)(216 \times 10^6 \, m^3)} \quad (21)$$

$$H_{bR} = \frac{a_m(10)(\text{Tesla} - m^3)(1/24.5)}{16(3.14)(2.16 \times 10^8 \, m^3)(2.16 \times 10^8 \, m^3)} \quad (22)$$

$$H_{bR} = \frac{a_m(10)(\text{Tesla} - m^3)(0.0408)}{235 \times 10^{16} \, m^6} \quad (23)$$

$$H_{bR} = \frac{a_m(0.408)\text{Tesla} - m^3}{234 \times 10^{18} \, m^6} = \frac{a_m(4.08 \times 10^{-1})\text{Tesla}}{2.34 \times 10^{18} \, m^3} \quad (24)$$

$$H_{bR} = a_m(1.74 \times 10^{-19})\text{Tesla}/m^3 \quad (25)$$

Figure 4:
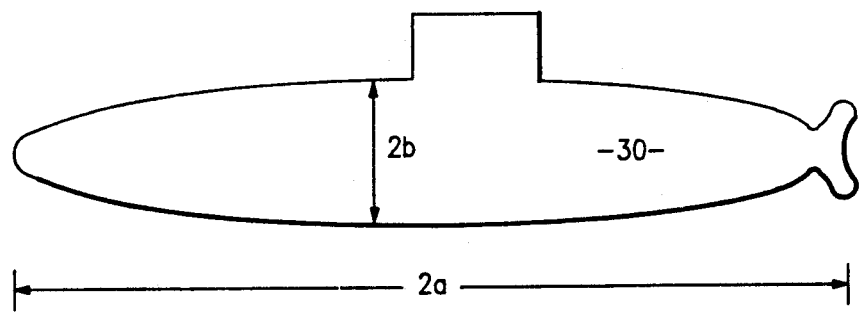
FIG. 4 shows a submarine that may be detected by the present invention.

As previously mentioned, $a_m$, the magnetic polarizability of an object, depends on a multitude of factors, including the size and shape of the object, its orientation relative to the incident magnetic field, and the material or materials from which the object is made. The magnetic polarizability of an object has the dimensions meters cube ($m^3$). For example, with reference to FIG. 4, a submarine 30 has the general shape of a prolate spheroid, with the length of that spheroid being its major axis, and the height or diameter of the spheroid being its minor axis. A prolate spheroid has one magnetic polarizability, $a_{ma}$, when the major axis of the spheroid is aligned with an incident magnetic field, and a different magnetic polarizability, $a_{mb}$, when the minor axis of the spheroid is aligned with an incident magnetic field.

More specifically, these magnetic polarizability values are given by the equations:

$$a_{ma} = -\frac{4\pi b^2 l^3}{3(al - b^2 \ln(a + l)/b)} \quad (26)$$

$$a_{mb} = -\frac{8\pi a b^2}{3\left(1 - \frac{b^2}{l^2} - \frac{ab^2}{l^3} - \ln\frac{a-l}{b}\right)} \quad (27)$$

where
a = one half the length of the major axis,
b = one half the length of the minor axis, and
$l = (a^2 - b^2)^{\frac{1}{2}}$.

For a 16,000 ton submarine having the shape of a prolate spheroid with a major axis of 154 meters and a minor axis of 14 meters, then:
a = 77 m,
b = 7 m, and
$l = (5929 \, m^2 - 49 \, m^2)^{\frac{1}{2}} = (5880 \, m^2)^{\frac{1}{2}} = 76.7 \, m$,
and, when its major axis is aligned with an incident magnetic field, the magnetic polarizability of the submarine is:

$$a_{ma} = -\frac{4\pi(7 \, m)^2(76.7 \, m)^3}{3\left((77 \, m)(76.7 \, m) - (7 \, m)^2 \ln\left(\frac{77 \, m + 76.7 \, m}{7 \, m}\right)\right)} \quad (28)$$

$$a_{ma} = \quad (29)$$

$$-\frac{4(3.14)(49 \, m^2)(7.67 \times 10^1 \, m)^3}{3\left((7.7 \times 10^1 \, m)(7.67 \times 10^1 \, m) - (49 \, m^2)\ln\frac{153.7 \, m}{7 \, m}\right)}$$

$$a_{ma} = -\frac{(615 \, m^2)(451 \times 10^3 \, m^3)}{3(59.1 \times 10^2 \, m^2 - (49 \, m^2)\ln 22.0)} \quad (30)$$

$$a_{ma} = -\frac{(6.15 \times 10^2 \, m^2)(4.51 \times 10^5 \, m^3)}{3(59.1 \times 10^2 \, m^2 - (49 \, m^2)(3.09))} \quad (31)$$

$$a_{ma} = -\frac{27.7 \times 10^7 \, m^5}{3(59.1 \times 10^2 \, m^2 - 151 \, m^2)} \quad (32)$$

$$a_{ma} = -\frac{27.7 \times 10^7 \, m^5}{3(59.1 \times 10^2 \, m^2 - 1.51 \times 10^2 \, m^2)} = \quad (33)$$

$$-\frac{27.7 \times 10^7 \, m^5}{3(57.6 \times 10^2 \, m^2)}$$

$$a_{ma} = -\frac{27.7 \times 10^7 \, m^5}{173 \times 10^2 \, m^2} = -\frac{2.77 \times 10^8 \, m^5}{1.73 \times 10^4 \, m^2} \quad (34)$$

$$a_{ma} = -1.60 \times 10^4 \, m^3 \quad (35)$$

Similarly, by using a = 77 m, b = 7 m and l = 76.7 m in Equation (27), the magnetic polarizability $a_{mb}$ of the submarine is calculated as:

$$a_{mb} = -7.69 \times 10^3 m^3 \quad (36)$$

Substituting $-1.60 \times 10^4 \, m^3$ for $a_m$ in Equation (25), shows that when the target conductive body is a submarine of the type as described above, and under the other conditions discussed above in connection with Equations (18) through (25), the expected maximum intensity of the induced magnetic field $H_b$ at the receiving means 22 of system 10 is:

$$H_{bR} = -1.60 \times 10^4 \, m^3 \, (1.74 \times 10^{-19} \, Tesla/m^3) \quad (37)$$

$$H_{bR} = -2.78 \times 10^{-15} \, Tesla \quad (38)$$

$$H_{bR} = -2.78 \times 10^{-6} \, nano \, Tesla \quad (39)$$

Such a magnetic field strength magnitude can be detected by state of the art receiving equipment and thus the system of the present invention may be used to detect submarines deeply immersed in seawater.

As will be understood by those of ordinary skill in the art, the magnetic fields $H_a$ and $H_b$ are caused by changes in electric currents conducted through transmitting means 20 and conductive body 12, and the magnetic fields $H_a$ and $H_b$ are propagated at the speed of electromagnetic waves. However, sinusoidal changes in the strengths of these magnetic fields $H_a$ and $H_b$—although propagating from their respective sources at the speed of electromagnetic waves—occur in synchronism with the current changing in transmitting means 20. Moreover, a time varying magnetic field undergoes speed reduction and a phase shift as it passes through a conducting medium.

Furthermore, the sum of, first, the phase shift in field $H_a$ caused by medium 14 as that field is propagated from transmitting means 20 to conductive body 12, and second, the phase shift in field $H_b$ caused by medium 14 as this field is propagated from the conductive body to receiving means 22, can be used to determine the sum of the distances $r_2$ and $r_3$.

To elaborate, the amplitude, H, of a sinusoidal electromagnetic wave propagating through a medium is given by the generalized expression:

$$H = H_0 e^{-\alpha z} \cos(\omega t - \beta z) \tag{40}$$

where $E_o$ is the maximum amplitude of the wave at its source, $\alpha$ is a constant, referred to as the attenuation constant, for the medium, and is a measure of the extent to which the amplitude of the wave is attenuated as it passes through the medium, z is the distance the wave has travelled through the medium.

$\omega = 2\pi f$, f is the frequency of the wave, t is time, and $\beta$ is a second constant, referred to as the phase shift constant, for the medium, and is a measure of the extent to which the phase of the wave is shifted as it passes through the medium.

Equation (40) can be rewritten in an exponential form as follows:

$$H = H_0 e^{-\alpha z} e^{-j\beta z} \tag{41}$$

$\alpha$ and $\beta$ can be considered to form a complex number, $\gamma$, referred to as the propagation constant for the medium, according to the following equation:

$$\gamma = \alpha + j\beta \tag{42}$$

This allows equation (41) to be rewritten as follows:

$$H = H_0 e^{-\alpha z} \tag{43}$$

From fundamental principles of electromagnetic wave theory, it can be derived that, for an electromagnetic wave propagating through a medium having a permittivity of $\epsilon$, a conductivity of $\sigma$ and a permeability of $\mu$, the general expression for the propagation constant $\gamma$ is:

$$\gamma = j\omega\sqrt{\mu\epsilon}\sqrt{1 - j\frac{\sigma}{\omega\epsilon}} \tag{44}$$

again, where $\omega$ equals $2\pi f$, and f is the frequency of the wave.

For any case where $$\frac{\sigma}{\omega\epsilon}$$

is much greater than 1, equation (44) can be simplified to:

$$\gamma = j\omega\sqrt{\mu\epsilon}\sqrt{-j\frac{\sigma}{\omega\epsilon}} \tag{45}$$

Equation (45) can be further simplified as follows:

$$\gamma = j\sqrt{-j\frac{\omega^2\mu\epsilon\sigma}{\omega\epsilon}} \tag{46}$$

$$\gamma = j\sqrt{-j\omega\mu\sigma} \tag{47}$$

$$\gamma = j\sqrt{-j}\sqrt{\omega\mu\sigma} \tag{48}$$

Since $j = \sqrt{-1}$, it can be shown that:

$$\sqrt{-j} = \frac{1}{\sqrt{2}} - j\frac{1}{\sqrt{2}} \tag{49}$$

Substituting the right side of equation (49) for $\sqrt{-j}$ in equation (48) shows that $$\gamma = j\left(\frac{1}{\sqrt{2}} - j\frac{1}{\sqrt{2}}\right)\sqrt{\omega\mu\sigma} \tag{50}$$

Equation (50) can then be rearranged as follows:

$$\gamma = \left(\frac{j}{\sqrt{2}} - \frac{1}{\sqrt{2}}\right)\sqrt{\omega\mu\sigma} \tag{51}$$

$$\gamma = \frac{j}{\sqrt{2}}\sqrt{\omega\mu\sigma} + \frac{1}{\sqrt{2}}\sqrt{\omega\mu\sigma} \tag{52}$$

$$\gamma = \frac{1}{\sqrt{2}}\sqrt{\omega\mu\sigma} + \frac{j}{\sqrt{2}}\sqrt{\omega\mu\sigma} \tag{53}$$

$$\gamma = \sqrt{\frac{\omega\mu\sigma}{2}} + j\sqrt{\frac{\omega\mu\sigma}{2}} \tag{54}$$

Substituting $2\pi f$ for $\omega$ in equation (54) gives $$\gamma = \sqrt{\frac{2\pi f\mu\sigma}{2}} + j\sqrt{\frac{2\pi f\mu\sigma}{2}} \tag{55}$$

and this simplifies to $$\gamma = \sqrt{\pi f\mu\sigma} + j\sqrt{\pi f\mu\sigma} \tag{56}$$

Comparing equation (56) to equation (42) shows that:

$$\beta = \sqrt{\pi f\mu\sigma} \tag{57}$$

and the total phase shift, $\phi$, measured in radians, which is caused in the wave travelling a distance z in the medium is:

$$\phi = z\sqrt{\pi f \mu \sigma} \quad (58)$$

Thus, if $\phi$ is measured or known, z can be calculated by the equation:

$$z = \frac{\phi}{\sqrt{\pi f \mu \sigma}} \quad (59)$$

For example, the conductivity of seawater is approximately 4 siemens/m, and the permeability of seawater is approximately $4\pi \times 10^{-7}$ Tesla-m/amp. These values can be converted to alternate, equivalent units as follows:

1 siemen = 1 amp/volt, and thus
4 siemens/m = 4 amp/volt-m; and
1 Tesla = 1 volt-sec/m², and thus $$4\pi \times 10^{-7} \text{ Tesla-m/amp} = 4\pi \times 10^{-7} \frac{\text{volt-sec}}{m^2} \cdot \frac{m}{\text{amp}}$$
$$= 4\pi \times 10^{-7} \frac{\text{volt-sec}}{m\text{-amp}}$$

Using these values for $\sigma$ and $\mu$ in equation (58) allows us to express a phase shift, measured in radians, in terms of the frequency of the electromagnetic wave as follows.

$$\phi = z\sqrt{(3.14)f(4)\left(3.14 \times 10^{-7} \frac{\text{volt-sec}}{\text{amp-}m}\right)\left(\frac{4\text{ amp}}{\text{volt-}m}\right)} \quad (60)$$

$$\phi = z\sqrt{f\left(158 \times 10^{-7} \frac{\text{sec}}{m^2}\right)} \quad (61)$$

Specifically, for a 1 Hz electromagnetic wave travelling through seawater for a distance of 100 meters, $$\phi = 100\,m\sqrt{(1/\text{sec})\left(158 \times 10^{-7} \frac{\text{sec}}{m^2}\right)} \text{ (radians)} \quad (62)$$

$$\phi = 100\,m\sqrt{15.8 \times 10^{-6}/m^2} \text{ (radians)} \quad (63)$$

$$\phi = (100\,m)(3.97 \times 10^{-3}/m) \text{ (radians)} \quad (64)$$

$$\phi = 397 \times 10^{-3} = 0.397 \text{ (radians)} \quad (65)$$

Similarly, for a 1 MHz electromagnetic wave travelling through seawater for a distance of one meter:

$$\phi = 1\,m\sqrt{(10^6/\text{sec})(158 \times 10^{-7}\,\text{sec}/m^2)} \text{ (radians)} \quad (66)$$

$$\phi = 1\,m\sqrt{158 \times 10^{-1}/m^2} = 1\,m\sqrt{15.8/m^2} \text{ (radians)} \quad (67)$$

$$\phi = (1\,m)(3.97)/m) = 3.97 \text{ (radians)} \quad (68)$$

Figure 5:
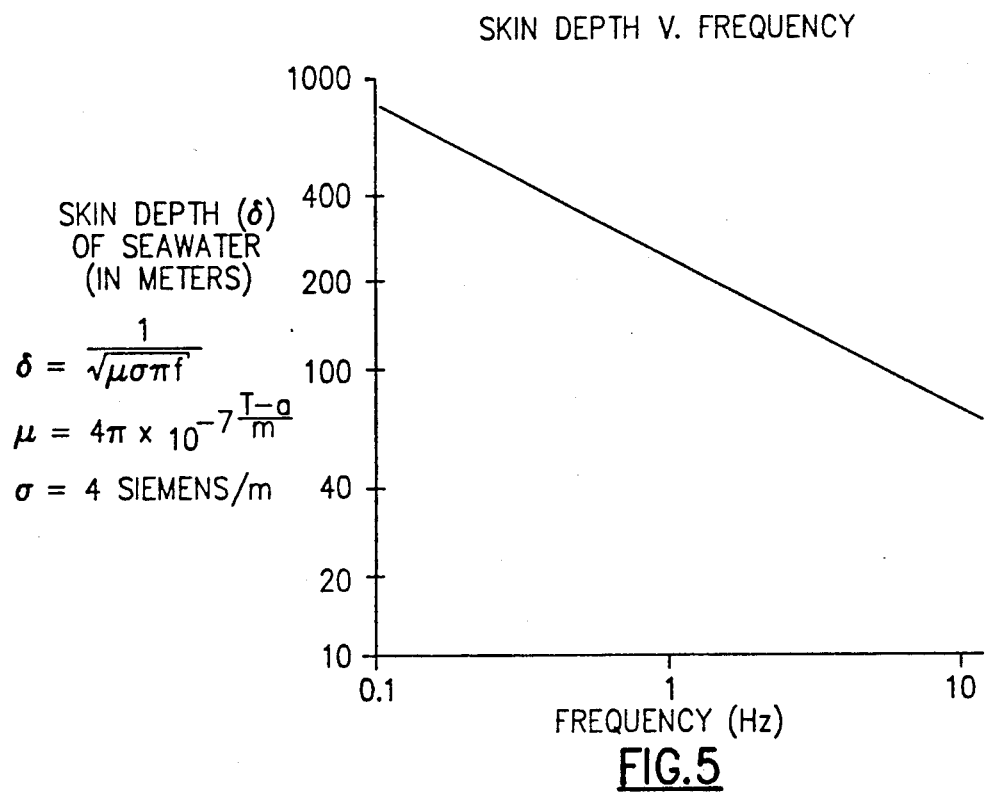
FIG. 5, 6 and 7 are graphs that show relationships between various parameters that may be taken into consideration in the design and operation of a detection system according to this invention.

As will be apparent from the foregoing, a number of factors are preferably taken into consideration when designing system 10 for, and using the system in, a specific application. One of these factors is the extent to which the medium 14 attenuates the magnetic fields $H_a$ and $H_b$. This factor is commonly expressed in terms of skin depth, which is the distance over which the medium attenuates a magnetic field by a factor of 1/e and causes a phase shift of one radian in the magnetic field. The skin depth of a medium depends on a number of variables, including the frequency of the electromagnetic field; and FIG. 5 illustrates how the skin depth of a medium, specifically seawater, varies with the frequency of the propagating electromagnetic field. An inverse relationship exists between these two parameters, and the skin depth of the medium tends to decrease as the frequency of the field increases; and for example, at frequencies of 0.1Hz, 1.0 Hz and 10 Hz, the skin depth of the seawater is approximately 700 m, 250 m and 70 m, respectively.

Figure 6:
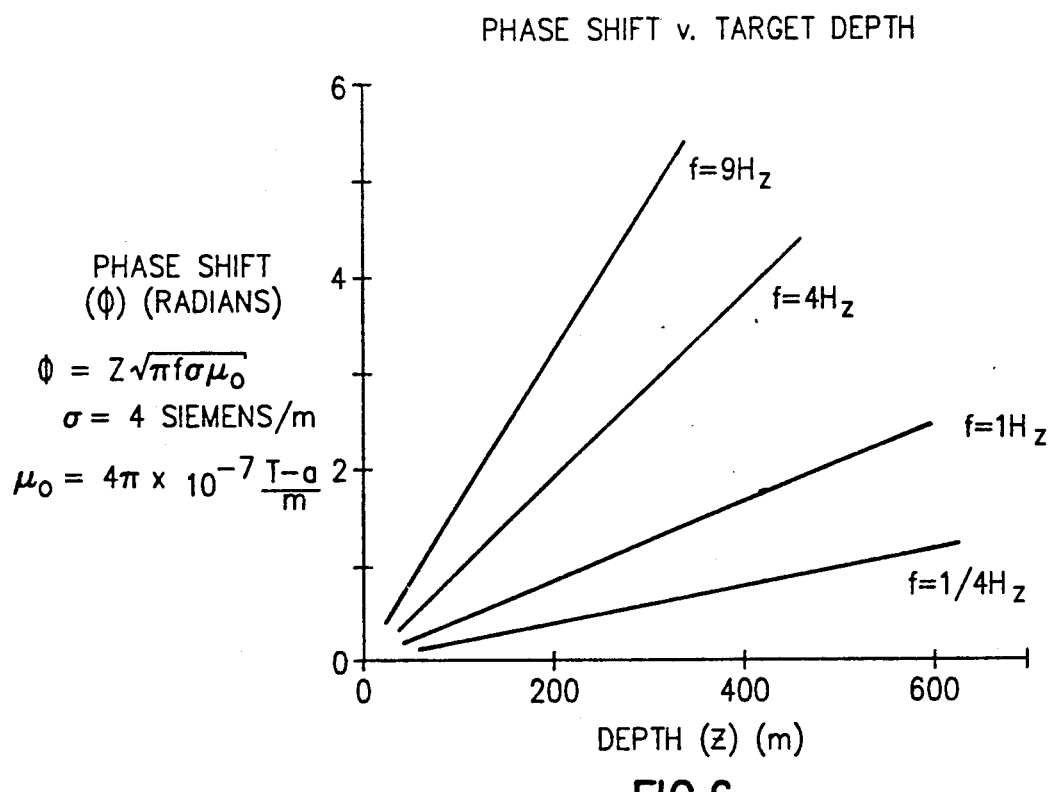

Another important factor is the extent of the phase shift caused in the magnetic fields $H_a$ and $H_b$ by the medium 14. This phase shift also depends on a number of parameters, such as the frequency of the propagating electromagnetic fields and the distance those fields pass through the medium. FIG. 6 illustrates the general relationship between the phase shift of the magnetic fields and these two other parameters when the medium is seawater; and, as can be seen, the phase shift, first generally decreases as the frequency of the propagating electromagnetic field increases, and second, generally increases as the distance the wave travels through the medium increases.

Figure 7:
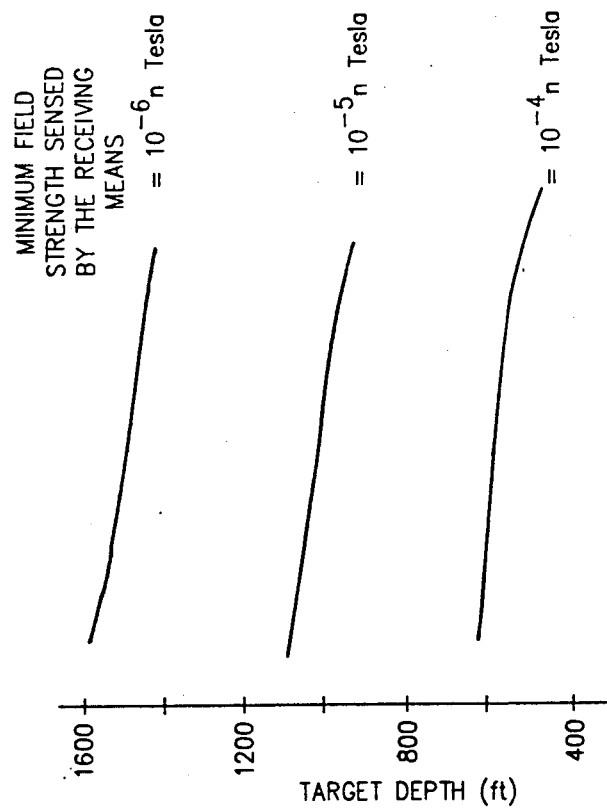

FIG. 7 is a chart that relates the maximum depth at which system 10 can detect a target having a magnetic polarizability of about 5340 m³, to the altitude of receiving means 22 for several receiving means having different maximum sensitivities. For example, if the receiving means can sense a magnetic field strength of $10^{-4}$ nano Tesla, then if the receiving means is located 500 ft above the surface of medium 14, system 10 can detect a submarine at a maximum depth of about 430 ft; and if the receiving means can sense a field strength of about $10^{-6}$ nano Tesla, then at a height of about 300 ft above the surface of medium 14, the receiving means can detect a submarine at a maximum depth of about 1500 ft.

FIG. 8 illustrates an embodiment of system 10 that has been actually reduced to practice to demonstrate the operability and effectiveness of the present invention, and the transmitting means 20 shown in FIG. 8 comprises a 1 MHz oscillator 32 connected to a driver 34 of a transmitting coil 36. Oscillator 32 is, for example, a Hewlett-Packard model No. 8116A function generator used to generate 1 MHz sine waves, and driver 34 is a variable gain amplifier consisting of an Elantec ED 20200N operational amplifier with a negative feedback path. Transmitting coil 36 has a diameter of 5¼ inches, and is formed by 20 turns of a #18 wire. Any suitable power source may be provided for transmitting means 20, specifically the driver and the amplifier thereof, and the amplifier may be biased in a conventional manner. With the above described transmitting means 22, a current of 0.095 amps may be conducted through coil 36, and if this is done, the coil then generates a magnetic moment having a maximum amplitude of approximately 36.8 nano Tesla-m³.

Receiving means 22 shown in FIG. 8 comprises receiving coil 38, isolation amplifier 40, differential amplifier 42, limiter 44 and variable gain amplifier 46. For example, the receiving coil has a diameter of two inches and is formed by 10 turns of #18 wire, and a biasing circuit is connected to the receiving coil. The isolation amplifier is connected to and receives the current induced in the receiving coil, and amplifies that current to a desired level. Isolation amplifier 40 is an Elantec EL 20200N operational amplifier having a negative feedback loop. Any suitable poser source may be provided for amplifier 40, and this amplifier may be biased in any suitable manner.

The magnetic field sensed by receiving means 22 has two components: a first component is the magnetic field $H_a$ generated by transmitting means 20 and propagated directly to the receiving means, and a second component is the magnetic fields $H_b$ generated by a target object. The electric current induced in coil 38 is proportional to the sum of these two components and, thus, this induced electric current can likewise be considered as being comprised of two components. Both of these components are transmitted to and amplified by isolation amplifier 40, and both of these amplified components are then transmitted to input 42a of differential amplifier 42.

Differential amplifier 40 is used to cancel from the electrical signal conducted to it the component of this electrical signal that is due to the magnetic field $H_a$; and the remaining component, if any, is then further amplified and transmitted to phase shift detection means 24. More specifically, a signal from oscillator 32 of transmitting means 20 is also transmitted to line 50, passed through attenuator 52 and phase shifter 54, and then applied to amplifier input 42b. Attenuator 52 and phase shifter 54 are provided to attenuate the amplitude and to shift the phase, respectively, of the signal applied to line 50 so that the amplitude and phase of the signal applied to amplifier input 42b match the amplitude and phase, respectively, of the component of the electric signal applied to amplifier input that is due to the magnetic field $H_a$. Amplifier 42 simply subtracts the signal applied to input 42b from the signal applied to input 42a, and the different between these two signals represents the component of the total magnetic field sensed by coil 38 that is due to the magnetic field induced in a target object. This differential signal is further amplified by amplifier 42 and may then be transmitted to phase shift detection means 24.

Preferably, however, the receiving means 22 shown in FIG. 8 also includes current amplitude limiting means 44 disposed between amplifier 42 and phase shift detection means 24, to limit the maximum amplitude of the current transmitted to the phase shift detection means to a level compatible with the components thereof. In addition, a variable gain amplifier 46 is located between limiter 44 and phase shift detection means 24 to allow an operator to adjust the amplitude of the signal transmitted to the phase shift detection means. The adjustment would be automatic in-field equipment.

Any suitable devices may be used as amplifiers 40, 42 and 46, current limiter 44, attenuator 52 and phase shifter 54. For instance, attenuator 52 is a Merrimac model No. AR5 attenuator, phase shifter 54 is a Merrimac model PSE-3-1B phase shifter, differential amplifier 40 is or includes an Analog Modules Model No. 333 operational amplifier, and limiter 44 is an RCA CA 3189 amplitude limiter. In addition, an inverting gain amplifier (not shown) may be located between phase shifter 54 and amplifier input 42b to amplify the output signal from the phase shifter. All of the above-discussed devices may be powered and operated in a conventional manner; and, for instance, filter circuits (not shown) may be provided to filter the input signals applied to amplifier inputs 42a and 42b and to filter the output signal from limiter 44.

With the embodiment of system 10 illustrated in FIG. 8, the phase shift detection means 26 includes both a phase shift detection circuit 60 and an oscilliscope 62. Each of these devices 60 and 62 receives input signals from both the transmitting means 20 and the receiving means 22, and more specifically, oscillator 32 and amplifier 46. Oscilliscope 62 is provided to display a picture or image representing the two input signals transmitted to the oscilliscope, to thereby provide a visual indication of the phase difference between these two signals.

Phase detection circuit 60 provides two output signals, referred to as quadrature signals, that identify the phase difference between the two input signals applied to this circuit. More specifically, circuit 60 includes a phase comparator 64, biasing circuits 66 and 70, set gain amplifier 72, attenuator 74 and variable gain amplifier 76. The signal from oscillator 32 is passed through attenuator 74 and variable gain amplifier 76, which may be controlled by an operator to adjust the level of that signal to a desired level, and this amplified signal is then passed through biasing circuit 66 and then to input 64a of comparator 64. The signal from receiving means 22, specifically amplifier 46, is passed through biasing circuit 70 and to input 64b of comparator 64. The two inputs to comparator 64 vary over time in sinusoidal wave patterns, and the difference between these two sinusoidal wave patterns is itself a sinusoidal wave pattern. The phase comparator produces two output signals that identify this differential sinusoidal wave pattern; and in particular, at any given point in time, the first and second output signals of the comparator are proportional, respectively, to the sine and cosine values of this differential wave pattern at that point in time. The output signals of comparator 64 are amplified by set gain amplifier 72 and then transmitted to depth determining means 26.

The depth determining means 26 illustrated in FIG. 8 includes analog-to-digital converter 80 and processor 82. Converter 80 receives the output signals from phase comparator 64 and converts those signals to corresponding digital signals that can be processed by processor 82; and these digital signals are transmitted to the processor, which processes the signals to determine the depth of the target body. Processor 82 may be programmed to calculate a depth value according to a given equation, and the processor may be provided with a look-up table to find the appropriate depth value for any given phase-shift value. In either case, vehicle adjunct sensor systems provide the processor with all the necessary data or program to calculate the depth value prior to starting operation of system 10. Processor 82 may be connected to conventional multifunction display devices, such as a conventional digital display, to show the calculated depth of a sensed target in medium 14.

Figure 9:
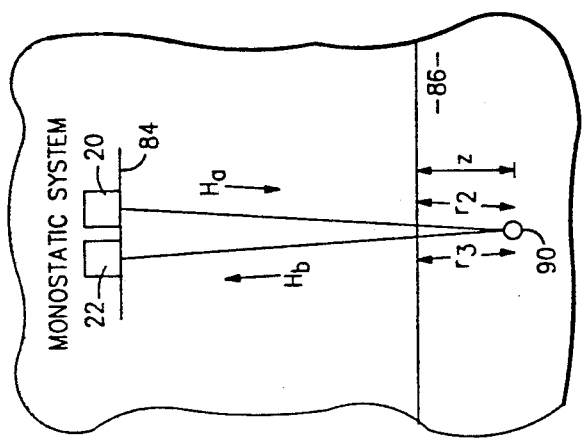
FIG. 9 illustrates one application of this invention, referred to as a monostatic operation.
Figure 10:
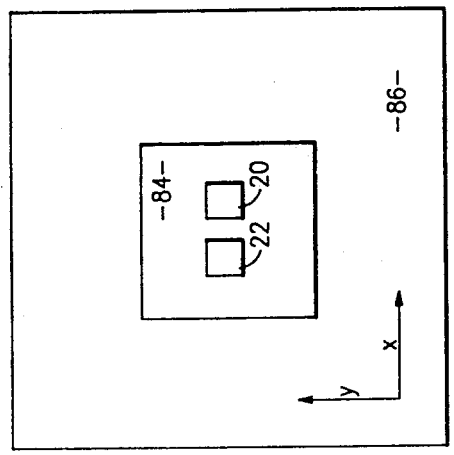
FIG. 10 is a top view of the system shown in FIG. 9.

FIGS. 9 and 10 illustrates one embodiment of system 10 in which transmitting means 20 and receiving means 22 are mounted on one movable platform 84; and, because the transmitting and receiving means are mounted on a single platform, this embodiment of system 10 is referred to as a monostatic system. Platform 84 is located a preset distance above the surface of a body of seawater 86, and the platform is supported by any suitable means (not shown) for movement in two orthogonal directions, in a plane parallel to the top surface of the water. These two directions are indicated by the x- and y-axes shown in FIG. 10, and are referred to herein as the x and y directions respectively. A conductive body 90, specifically a one shorted turn coil of electric wire, is located in the water several inches below the top surface thereof. An alternating current, having a frequency of 1 MHz, is conducted through the coil of the transmitting means to generate a time varying electromagnetic field, which produces a magnetic field $H_a$ having a time varying strength. The transmitting and receiving coils 36 and 38 of system 10 are not shown in FIGS. 9 and 10. However, these coils were positioned to minimize the electric current induced in the receiving coil by the primary magnetic field generated by the transmitting coil prior to introduction of the one turn target.

The velocity of an electro-magnetic wave through air is substantially equal to the speed of light in a vacuum, $3.0 \times 10^8$ m/sec. The wave length, $\lambda$, of the electromagnetic wave generated by the transmitting means 22 is given by the equation:

$$\lambda = \frac{v}{f} = \frac{3.0 \cdot 10^8 \text{ m/sec}}{10^6/\text{sec}} = 3.0 \times 10^2 \text{ m} \quad (69)$$

According to classical electromagnetic wave theory, the wave length and the speed of propagation of a time varying electromagnetic wave passing from air into a lesser conducting medium both become greatly reduced. For such a wave having a frequency f traveling in a medium having a permeability $\mu$ and conductivity $\sigma$, the velocity, v, and wave length, $\lambda$, of the wave in the lesser conducting medium are, respectively given by the equations:

$$v = 2\sqrt{\frac{\pi f}{\sigma \mu}} \quad (70)$$

$$\lambda = \frac{v}{f} = \frac{2}{f}\sqrt{\frac{\pi f}{\sigma \mu}} = 2\sqrt{\frac{\pi}{\sigma \mu f}} \quad (71)$$

The permeability of sea water is approximately $4\pi \times 10^{-7}$ Tesla-m/amp, and the conductivity of sea water is approximately 4 siemens/m. Thus, an electromagnetic wave having a frequency of 1 MHz is propagated in sea water at a velocity:

$$v = 2\sqrt{\frac{\pi(10^6/\text{sec})}{(4 \text{ amp/volt-m})(4\pi \times 10^{-7} \text{ volt-sec/amp-m})}} \quad (72)$$

$$v = 2\sqrt{\frac{10^6/\text{sec}}{16 \times 10^{-7} \text{ sec/m}^2}} = \quad (73)$$

$$v = 2\sqrt{62.5 \times 10^{10} \text{ m}^2/\text{sec}^2} = \frac{2\sqrt{0.0625 \times 10^{13} \text{ m}^2/\text{sec}^2}}{} = 2(7.91 \times 10^5 \text{ m/sec}) \quad (74)$$

$$v = 15.8 \times 10^5 \text{ m/sec} \quad (75)$$

and the wave has a wave length:

$$\lambda = \frac{15.8 \times 10^5 \text{ m/sec}}{10^6/\text{sec}} = 15.8 \times 10^{-1} \text{ m} = 1.58 \text{ m} \quad (76)$$

The ratio of the velocity of this wave in air compared to the velocity of the wave in sea water is:

$$\frac{v_a}{v_s} = \frac{3.0 \cdot 10^8 \text{ m/sec}}{15.8 \times 10^5 \text{ m/sec}} = .190 \times 10^3 = 190 \quad (77)$$

Because of this very large ratio, as long as the wave length of the electromagnetic wave used to propagate the magnetic field $H_a$ is very lager compared to the total length of the path from transmitting means 20 to conductive body 90 to receiving means 22, the phase shift imparted to magnetic fields $H_a$ and $H_b$ by the air may be ignored, and the entire measured or detected phase shift can be considered as being caused by the lesser conducting medium. This is especially true as the operating frequency decreases.

The presence of the target body 90 in seawater 86 is inferred from the presence of a phase shifted, time varying magnetic field $H_b$ sensed by receiving means 22, and it is not necessary that the extent or size of this phase shift be measured in order to conclude that a conductive body is located in the sea water.

Moreover, the surface coordinates of the conductive body—that is, its x and y coordinates—can also be determined without determining the extent or size of any detected phase shift. To elaborate, to determine the surface coordinates of the target body, platform 84 is moved until the sensed magnitude of the magnetic field $H_b$ is at a maximum. At this position of platform 84, the conductive body 90 is directly below the platform— since it is at this position of the platform that the sum of $r_2 + r_3$ is a minimum—and thus the surface coordinates of the target body are the same as those of the platform.

Several different specific procedures may be used to position platform 86 directly above the conductive body. For example, the platform may simply be moved in any direction in which the sensed strength of $H_b$ increases, until the platform reaches the location at which the sensed strength of $H_b$ is a maximum. Alternately, platform 86 may be moved in a straight line along one particular direction, such as along the x-axis shown in FIG. 10, until the platform reaches the position on that line where the sensed strength of $H_b$ is a maximum. From this position, the platform may be moved in a second direction orthogonal to the first direction, such as along the y-axis shown in FIG. 10, until the platform reaches the position in this direction at which the sensed strength of $H_b$ is a maximum. At this latter position, the platform is directly above conductive body 90.

Preferably, system 10 is also used to determine the depth or z coordinate of any detected target body, and there are several ways to do this. For example, as mentioned above, it can be assumed that the entire phase shift of the magnetic fields is due to their travel through water 86, and the length of this travel is $r_2 + r_3$. Substituting $r_2 + r_3$ for z in equation (59) gives:

$$r_2 + r_3 = \frac{\phi}{\sqrt{\pi f \mu \sigma}} \quad (78)$$

When platform 84 is moved to a position at which the sensed magnetic field $H_b$ is at a maximum—when the platform is directly above the target body—$r_2$ and $r_3$ are substantially equal to each other and to the depth, z, of the target body in the sea water. Hence, at this position of the platform:

$$r_2 = r_3 = z \quad (79)$$

Substituting z for each of $r_2$ and $r_3$ in equation (78) gives $$z - z = \frac{\phi}{\sqrt{\pi f \mu \sigma}} = 2z \quad (80)$$

Solving for z yields:

$$z = \frac{\phi}{2\sqrt{\pi f \mu \sigma}} \quad (81)$$

As previously mentioned, for a 1 MHz electromagnetic wave, the wave length of the wave in the atmosphere is, $\lambda_a = 3.0 \times 10^2$ m, and the wave length of the wave in sea water is, $\lambda_s = 1.58$ m. As long as the total path, 2z, of travel of the magnetic fields $H_a$ and $H_b$ through medium 86 is less then one wave length, 1.58 m, the detected phase shifts of those magnetic fields may be used to determine the depth of the target body unambiguously. That is, the range, z, of system 10 operating at this wave length is:

$$Z = \frac{1.58 \text{ m}}{2} = 0.79 \text{ m} \quad (82)$$

To demonstrate the efficacy of system 10, the system was operated as described above in connection with FIGS. 9 and 10, once with the target body located 4.5 inches below the surface of the water, and again with the target body located 6.0 inches below the surface of the water. FIGS. 11a and 11b show the sinusoidal wave patterns of the field $H_a$ produced by the transmitting means 22 and the field $H_b$ produced by the conductive body 90 during these two operations. Each of these Figures shows a phase difference between the two magnetic fields. The fact that a phase shifted magnetic field $H_b$ was sensed showed that the conductive body 90 was present in the sea water. Also, the phase shift of the sensed magnetic field $H_b$ is greater in FIG. 11b than in FIG. 11a, which is expected since, in the latter case, the magnetic fields travel further through the sea water.

FIGS. 12 and 13 illustrate a second embodiment and application of system 10, in which the system is used to detect an electrically conductive body such as submarine 92 immersed in a body of seawater 94. With the system 10 shown in FIGS. 12 and 13, transmitting means 20 and receiving means 22 are located on separate platforms 96 and 98 respectively, and because of this, this embodiment of system 10 is referred to as a bistatic system.

Moreover, as shown in FIGS. 12 and 13, platforms 96 and 98 are airplanes, and thus each platform is movable relative to the other platform and to the submarine 92. To simplify calculations, the airplanes are maintained at a constant altitude, h, above the surface of the seawater, and these planes are maintained separated by a fixed distance $r_5$.

Transmitting means 20 generates a time varying magnetic field $H_a$, which varies in a sinusoidal pattern at a frequency f. This magnetic field induces an electric current in submarine 92, which in turn generates a secondary time varying magnetic field $H_b$. This secondary magnetic field is sensed by receiving means 22, which generates a signal proportional to the strength of the sensed secondary magnetic field. This signal is conducted to phase shift detection means (not shown in FIGS. 12 and 13), which produces a signal indicating the extent of the phase shift caused in fields $H_a$ and $H_b$ by seawater 94 as field $H_a$ is transmitted to the submarine and field $H_b$ is transmitted to the receiving means.

For example, airplanes 96 and 98 may be maintained at an altitude of substantially 150 meters and maintained 600 meters from each other. Under such conditions, the time varying magnetic field $H_a$ may have a frequency between 1 and 10 Hz, because at such frequencies, the phase shift of the time varying magnetic fields $H_a$ and $H_b$ occurring in the atmosphere is negligible compared to the phase shifts of those fields occurring in the sea water.

In particular, the wave length in the atmosphere of an electromagnetic wave having a frequency of 1 Hz is:

$$\lambda = \frac{c}{f} = \frac{3.0 \times 10^8 \text{ m/sec}}{1/\text{sec}} = 3.0 \times 10^8 \text{ m} \quad (83)$$

The wavelength of the same wave in sea water is given by the equation (71):

$$\lambda = \frac{v}{f} = \frac{2}{f}\sqrt{\frac{\pi f}{\sigma \mu}} = 2\sqrt{\frac{\pi}{\sigma \mu f}} \quad (71)$$

using the following values in equation (71),
f = 1 hertz
$\sigma = 4$ amp/volt-m,
$\mu = 4\pi \times 10^{-7}$ volt-sec/amp-m,
yields the following:

$$\lambda = \sqrt{\frac{\pi}{(1/\text{sec})(4 \text{ amp/volt-m})(4\pi \times 10^{-7} \text{volt-sec/amp-m})}} \quad (84)$$

$$\lambda = 2\sqrt{\frac{1}{16 \times 10^{-7}/\text{m}^2}} = 2\sqrt{0.0625 \times 10^7 \text{ m}^2} \quad (85)$$

$$\lambda = 2\sqrt{62.5 \times 10^4 \text{ m}^2} = 2(7.90 \times 10^2)\text{m} = 1580 \text{ m} \quad (86)$$

By generating a primary magnetic moment $M_a$ having a maximum intensity of 31 Tesla-m$^3$, system 10 can detect a submarine at a depth of up to 400 meters. To elaborate, the intensity of the magnetic field $H_b$ at the receiving means 22, expressed in terms of the intensity of the magnetic moment generated by transmitting means 24, the magnetic polarizability $a_m$ of submarine 92, and the distances $r_1$, $r_2$, $r_3$ and $r_4$ shown in FIG. 12, is given by equation (11):

$$H_{br} = \frac{a_m M_a e^{-(r_2+r_3)/\delta}}{16\pi^2 (r_3 + r_4)^3 (r_1 + r_2)^3} \quad (11)$$

Using the following values in equation (11),
$H_o = 31$ Tesla-m$^3$,
$a_m = -7.69 \times 10^3$ m$^3$,
$r_2 = r_3 = 400$ m,
$r_1 = r_4 = 150$ m,
$\delta = 250$ m,
yields the following:

$$H_{br} = (-7.69 \times 10^3 \text{ m}^3)(31T - \text{m}^3)\left(\frac{e^{-(400\text{ m} + 400\text{ m})/250\text{ m}}}{4\pi^2(150\text{ m} - 400\text{ m})^3(400\text{ m} + 150\text{ m})^3}\right) \quad (87)$$

$$H_{bR} = -(238 \times 10^3 T - \text{m}^6)\frac{e^{-800\text{ m}/250\text{ m}}}{4(3.14)^2(550\text{ m})^3(550\text{ m})^3} \quad (88)$$

$$H_{bR} = -(238 \times 10^3 T - \text{m}^6)\frac{e^{-3.2}}{4(9.87)(166.4 \times 10^6 \text{ m}^3)(166.4 \times 10^6 \text{ m}^3)} \quad (89)$$

$$H_{bR} = -(238 \times 10^3 T - \text{m}^6)\frac{1/e^{3.2}}{4(9.87)(2.77 \times 10^{16} \text{ m}^6)} \quad (90)$$

$$H_{bR} = -(238 \times 10^3 T - \text{m}^6)\frac{1/24.5}{109.4 \times 10^{16} \text{ m}^6} \quad (91)$$

$$H_{bR} = -(238 \times 10^3 T)\frac{0.0408}{10^9 \times 10^{16}} = -238 \times 10^3 T\frac{4.08 \times 10^{-2}}{1.09 \times 10^{18}} \quad (92)$$

$$H_{bR} = -2.38 \times 10^5 T(3.74 \times 10^{-20}) = -8.90 \times 10^{-15} T = -8.90 \times 10^{-6} nT \quad (93)$$

Such a magnetic field can be detected by state of the art magnetic field sensors known as SQUIDS.

Moreover, the desired primary magnetic moment $M_a$ can be generated by conducting a $10^4$ amp current through a superconducting coil having a diameter of $10^2 \text{m}^2$ and formed by 25 turns of a wire. Specifically, the magnetic moment generated by such a transmitting coil is given by the equation (16):

$$M_a = \mu N I A \quad (16)$$

Substituting $4\pi \times 10^{-7}$ Tesla-m/amp for $\mu$, and using the above-given values for N, I and A in equation (16) gives:

$$M_a = \left(4\pi \times 10^{-7}\frac{\text{Tesla-m}}{\text{amp}}\right)(25)(10^4 \text{ amp})(10^2 \text{ m}^2) \quad (94)$$

$$M_a = 100\pi \times 10^{-1} \text{ Tesla-m}^3 \quad (95)$$

$$M_a = 314 \times 10^{-1} \text{ Tesla-m}^3 = 31.4 \text{ Tesla-m}^3 \quad (96)$$

This desired current level at a frequency of 1 Hz can be achieved by forming the coil from a superconducting material.

With a bistatic system, such as a system shown in FIGS. 12 and 13, the surface coordinates of a detected target can be determined in the following manner. First, airplanes 96 and 98 are flown in a first direction, such as along the x-axis shown in FIGS. 12 and 13. The sensed strength of magnetic field $H_b$ will be at a maximum when the planes are equidistant from the submarine, because it is at this position of the airplanes that the sum of $r_1 + r_2 + r_3 + r_4$ is the minimum. Thus, the x-coordinate of the submarine is the x-coordinate that is midway between the x-coordinates of the airplanes 96 and 98 when the sensed strength of magnetic field $H_b$ is at a maximum. This x-coordinate defines a plane; and once this plane is known, the two airplanes are then flown in this plane in a second direction, such as along the y-axis shown in FIG. 13. The sensed strength of magnetic field $H_b$ will again be at a maximum when the airplanes are equidistant from the submarine, and the y coordinate of the submarine is the y coordinate midway between the y coordinates of the airplanes when this sensed strength of magnetic field $H_b$ is its maximum.

Once the surface coordinates of the submarine are determined, the depth, z, of the submarine can be determined from the measured phase shift in the magnetic fields $H_a$ and $H_b$. More specifically, to do this, airplanes 96 and 98 are flown at a constant altitude, at a fixed distance from each other and in a vertical plane in which submarine 92 is located. The airplanes are flown to a position where the sensed strength of magnetic field $H_b$ is at a maximum; and, with reference to FIG. 12, at this position of the airplanes, $r_2 = r_3$. By substituting $r_2 + r_3$ for z in equation (59), $r_3$ can be determined as follows:

$$r_2 + r_3 = \frac{\phi}{\sqrt{\pi f \mu \sigma}} \quad (97)$$

$$r_3 + r_3 = \frac{\phi}{\sqrt{\pi f \mu \sigma}} = 2r_3 \quad (98)$$

$$r_3 = \frac{\phi}{2\sqrt{\pi f \mu \sigma}} \quad (99)$$

Since $\phi$, f, $\mu$ and $\sigma$ are all known or determined, $r_3$ can be determined; and once $r_3$ is known, the depth, z, of the submarine 92 in seawater 94 can be determined by processing means 82 of system 10. This processing means may be programmed to calculate z from $r_3$ according to a given equation, or the processing means may be provided with a look-up table to determine z values from given $r_3$ values. FIG. 14 illustrates, for example, one relationship between $r_3$ and z; and as shown therein, when $r_3 = 256$ m, z = 200 m, when $r_3 = 450$ m, z = 400 m, and when $r_3 = 644$ m, z = 600 m.

While it is apparent that the invention herein disclosed is well calculated to fulfill the objectives previously stated, it will be appreciated that numerous modifications and embodiments may be devised by those skilled in the art, and it is intended that the appended claims cover all such modifications and embodiments as fall within the true spirit and scope of the present invention.

We claim:

1. A method of determining the depth of an electrically conductive body in a medium having a known conductivity and a known permeability, comprising the steps of:

generating a primary magnetic field from an electromagnetic wave transmitting means located a distance apart from said conductive body, said primary magnetic field having a time-varying field strength;

generating a first signal representing the time-varying field strength of said primary magnetic field;

transmitting the primary magnetic field from said transmitting means into the medium, wherein the primary magnetic field induces an electric current in the conductive body, and the electric current generates a secondary magnetic field having a time-varying field strength and propagating outward from the conductive body and through the medium;

sensing the strength of the secondary magnetic field by a receiving means, said receiving means generating a second signal representing the time-varying field strength of said secondary magnetic field;

conducting said first and second signals to a comparator means; the comparator means, processing said first and second signals to obtain a third signal having a value indicating the magnitude of a phase difference between said primary and secondary magnetic fields caused by the primary magnetic field propagating through the medium to the conductive body, and by the secondary magnetic field propagating outward from the conductive body and through the medium; and transmitting the third signal to a processor means, the processor means calculating the depth of the conductive body in the medium from the third signal and the conductivity and permeability of the medium.

2. A method according to claim 1, wherein the medium has a conductivity of less than $10^4$ siemens/m.

3. A method according to claim 2, wherein the medium is water.

4. A method according to claim 1, wherein:
the field strength of the primary magnetic field varies at a given frequency;
the field strength of the secondary magnetic field also varies at the given frequency; and
the given frequency is less than about $10^6$ Hz.

5. A method according to claim 4, wherein:
the given frequency is less than 10 Hz;
the conductivity of the medium at said given frequency is approximately 4 siemens/meter;
the permeability of the medium at said given frequency is approximately $4\pi \times 10^{-7}$ Telsa-m/amp.

6. A method according to claim 5, wherein the conductive body has a magnetic moment in a known range.

7. A method according to claim 1
further comprising the step of locating the transmitting means and the receiving means on a common platform supported for movement over the medium.

8. A method according to claim 7, further comprising the steps of:
maintaining the platform at a fixed height above the medium; and
locating the platform at a position where the sensed strength of the secondary magnetic field is a maximum.

9. A method according to claim 1 further comprising the steps of
i) locating the transmitting means on a first platform supported for movement over the medium, and ii) locating the receiving means on a second platform supported for movement over the medium.

10. A method according to claim 9, wherein each of the first and second platforms are supported for movement independent of the other platform over the medium.

11. A method according to claim 9, further comprising the steps of:
maintaining both the first and second platforms at a common, fixed height above the medium; and
moving the first and second platforms to positions where the sensed strength of the secondary magnetic field is a maximum to help identify the location of the conductive body.

12. A method of determining the depth of an electrically conductive body in a medium having a known conductivity and a known permeability, comprising the steps of:

generating in a second medium a primary magnetic field from an electromagnetic wave transmitting means located a distance apart from said first medium, said primary magnetic field having a time-varying field strength;

generating a first signal representing the time-varying field strength of said primary magnetic field;

transmitting the primary magnetic field from said transmitting means into the first medium, wherein the primary magnetic field induces an electric current in the conductive body, and the electric current generates a secondary magnetic field having a time-varying field strength and propagating outward from the conductive body, through the first medium and into the second medium;

sensing the strength of the secondary magnetic field by a receiving means located in the second medium, said receiving means generating a second signal representing the time-varying field strength of said secondary magnetic field;

conducting said first and second electric signals to a comparator means; the comparator means, processing said first and second electrical signals to obtain a third signal having a value indicating the magnitude of a phase difference between said primary and secondary magnetic fields that is caused by the first medium as (i) the primary magnetic field is transmitted therethrough to the conductive body, and (ii) the secondary magnetic field propagates outward from the conductive body and through the first medium; and transmitting the third signal to a processor means, the processor means calculating the depth of the conductive body in the first medium from the third signal and the conductivity and permeability of the medium.

13. A method according to claim 12, wherein the first medium has a conductivity of less than $10^4$ siemens/m.

14. A method according to claim 13, wherein the second medium is air.

15. A method according to claim 13, wherein the first medium is water.

16. A method according to claim 13, wherein the field strengths of both the primary and secondary fields vary at a frequency less than about $10^6$ Hz.

17. A method according to claim 12, wherein:
the processor means includes a table having
i) values for the third signal, and
ii) associated depth values for the conductive body; and the calculating step includes the step of obtaining a depth value for the conductive body from the table.

18. A method according to claim 12, wherein the calculating step includes the step of solving an equation to determine the depth of the conductive body in the medium from the third signal and the conductivity and permeability of the medium.

19. Apparatus for determining the depth of an electrically conductive body in a medium having a known conductivity and a known permeability, comprising:
transmitting means located a distance apart from said conductive body to generate a primary magnetic field having a time-varying field strength, and to transmit the magnetic field into the medium, wherein the magnetic field induces an electric current in the conductive body, and the electric current generates a secondary magnetic field having a time-varying field strength and propagating outward from the conductive body and through the medium, said transmitting means further including a means for generating a first signal representing the time-varying field strength of said primary magnetic field;
receiving means to sense the secondary magnetic field and to generate a second signal proportional to the strength thereof;
phase shift detecting means connected to the receiving means to receive said second signal therefrom, and further adapted to receive said first signal from said transmitting means, wherein said phase shift detecting means further includes comparator means for processing said first and second signals and to generate therefrom a third signal having a value indicating the magnitude of a phase difference between said primary and secondary magnetic fields caused by the medium as the primary magnetic filed is transmitted through the medium to the conductive body, and as the secondary magnetic field propagates outward from the conductive body and through the medium; and
depth determining means connected to the phase shift detecting means to receive said third signal therefrom and to calculate the depth of the conductive body from the third signal and the conductivity and permeability of the medium.

20. Apparatus according to claim 19, wherein the transmitting means includes means to generate the primary magnetic moment with a maximum strength of about 31 Tesla-m$^3$, and to vary the primary magnetic field strength at a frequency of about 1 Hz.

21. Apparatus according to claim 20, wherein the receiving means includes means to sense the secondary magnetic field having a strength of about $10^{-6}$ nano-Tesla, and where the field strength of the secondary magnetic field varies at a frequency of about 1 Hz.

22. Apparatus according to claim 20, wherein the receiving means includes means to sense the secondary magnetic field having a strength of about $10^{-4}$ nano-Tesla, and where the field strength of the secondary magnetic field varies at a frequency of about 1 Hz.

23. Apparatus according to claim 19, wherein said depth determining means includes:
a look-up table of depth values that correspond to a respective value of said third signal; and
means for looking up the value of said third signal in said table and obtaining therefrom its corresponding depth value.

24. A method of determining the depth of an electrically conductive body in a medium having a known conductivity and a known permeability, comprising the steps of:
generating a primary magnetic field from a transmitting means located a distance apart from said conductive body, said primary magnetic field having a time-varying field strength;
generating a first signal representing the time-varying field strength of said primary magnetic field;
transmitting the primary magnetic field from said transmitting means into the medium, wherein the primary magnetic field induces an electric current in the conductive body, and the electric current generates a target secondary magnetic field having a time-varying field strength and propagating outward from the conductive body and through the medium;
sensing the strength of the secondary magnetic field by a receiving means and generating therefrom a second signal representing the time-varying field strength of said secondary magnetic field;
conducting said first and second electrical signals to a comparator means;
the comparator means,
processing said first and second signals to obtain a third signal having a value indicating the magnitude of a phase shifted target returns in the primary and secondary magnetic fields that is caused by the medium as (i) the primary magnetic field is transmitted through the medium to the conductive body, and (ii) the secondary magnetic field propagates outward from the conductive body and through the medium;
transmitting the third signal to a processor means, the processor means
calculating the depth of the conductive body in the first medium from the third signal and the conductivity and permeability of the medium.

25. A method according to claim 24, wherein the medium is water and has a conductivity of less than $10^4$ siemens/m.

26. A method according to claim 25, wherein the field strengths of both the primary and secondary fields vary at a frequency less than about $10^6$ Hz.

27. A method according to claim 1, wherein said processor means includes a look-up table of depth values that correspond to a respective value of said third signal, and wherein said calculating step includes the step of looking for the value of said third signal in said table and obtaining therefrom its corresponding depth value.

28. A method according to claim 1, wherein the calculating step includes the step of solving an equation to determine a depth value from the third signal and the conductivity and permeability of the medium.

29. Apparatus according to claim 19, wherein the transmitting means varies the field strength of the primary magnetic field at a frequency less than 10 Hz.

* * * * *

UNITED STATES PATENT AND TRADEMARK OFFICE
CERTIFICATE OF CORRECTION

PATENT NO. : 5,119,028

DATED : June 2, 1992

INVENTOR(S) : John J. Mooney, et al.

It is certified that error appears in the above-identified patent and that said Letters Patent is hereby corrected as shown below:

Column 4, line 4: after "such" insert --as--

Column 4, line 42: "conducive" should read as --conductive--

Column 6, line 65: "detecting" should read as --detection--

Column 7, line 65: "178" should read as --$1/2$--

Column 8, line 40: "boy" should read as --body--

Column 8, line 43: "$e_{-r}$" should read as --$e^{-r}$--

Column 9, line 39: "$e_{-r}$" should read as --$e^{-r}$--

Column 10, lines 8, 23, 26, 29 & 44, in all instances: "r2 + r3" should read as --$r_2 + r_3$--

Column 17, line 4: "poser" should read as --power--

Column 17, lines 22 & 23: "electrical" should read as --electric--

Column 17, line 38: "different" should read as --difference--

UNITED STATES PATENT AND TRADEMARK OFFICE
CERTIFICATE OF CORRECTION

PATENT NO. : 5,119,028

DATED : June 2, 1992

INVENTOR(S) : John J. Mooney, et al.

It is certified that error appears in the above-identified patent and that said Letters Patent is hereby corrected as shown below:

Column 20, line 10: "lager" should read as --large--

Column 22, line 60: "$H_{br}$" should read as --$H_{bR}$--

Column 23, line 2: "$H_{br}$" should read as --$H_{bR}$--

Column 24, line 25: "Hb" should read as --$H_b$--

Column 26, line 16, Claim 12: "a medium" should read as --a first medium--

Column 28, line 50, Claim 26: "a frequency" should read as --a given frequency--

Signed and Sealed this

Twenty-third Day of November, 1993

Attest:

BRUCE LEHMAN

Attesting Officer

Commissioner of Patents and Trademarks